Figure 1:
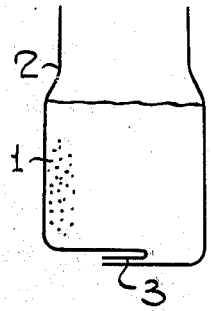

Nov. 11, 1952     R. G. NEWBERG ET AL     2,617,775

COMPOUNDING PACKAGED POWDERS INTO RUBBER

Filed Jan. 13, 1949

Raymond G. Newberg
Francis P. Baldwin   Inventors

By W. H. Smyers Attorney

UNITED STATES PATENT OFFICE 2,617,775

COMPOUNDING PACKAGED POWDERS INTO RUBBER

Raymond G. Newberg, Cranford, and Francis P. Baldwin, Woodbridge, N. J., assignors to Standard Oil Development Company, a corporation of Delaware Application January 13, 1949, Serial No. 70,784

9 Claims. (Cl. 260—4)

This invention relates to a novel method of packaging finely divided solids, particularly those intended to be used in certain manufacturing processes. More particularly, the invention relates to the packaging of carbon black or other finely divided solids in a self-supporting plastic film container or wrapper, the latter which may if desired be milled, kneaded or otherwise mixed directly with the finely divided solids contained therein, preferably while such materials are being milled into other materials in a manufacturing process, such as the milling of carbon black or compounding ingredients into a batch of rubber before vulcanization.

One of the major problems in normal rubber factories is the preponderance of atmospheric contamination caused by carbon black dust and fine dust particles originating from the various compounding ingredients. This condition results in excessive wear on machinery and in unhealthful working areas. In many cases it precludes the possibility of processing white or light colored stocks because of contamination. In addition, the production schedule used heretofore requires that a weighing operation be carried out for each compounding procedure. By means of the present invention, the problems outlined above may most expeditiously be alleviated, and also several further unexpected advantages are obtained.

One feature of the present invention is the provision of a container made of self-supporting thermoplastic film or sheet. Another embodiment of the invention is a package comprising a container as just described, at least partially filled with comminuted solids, and according to this feature of the invention it is preferred that the comminuted solids for this purpose be ingredients intended to be compounded by milling, kneading or otherwise into some other liquid or plastic solid base stock such as rubber, resin, oil, etc., and that when thus used, the thermoplastic substance of which the container is made will be compatible with and may be compounded with or mixed into the base stock together with the comminuted solid. A further feature of the invention comprises the process of actually compounding the container and comminuted solids into the rubber or other plastic or liquid base stock, preferably without removing the comminuted solids from the container, and if desired, without even opening the container. A preferred modification of the invention is the packaging of carbon black and/or other rubber compounding ingredients in a bag made of a thin self-supporting film made of a styrene-isobutylene copolymer having a combined styrene content of about 50% having an intrinsic viscosity of about 1.

The invention will be better understood from the following more detailed specification.

The comminuted solids which may be packaged according to the present invention, include powdered materials, crystalline, granulated, flaky, or other regular or irregularly shaped finely divided solid material. The invention is particularly intended to apply to rubber compounding ingredients, chiefly carbon black and especially of the channel black variety because it is so fine and dusty, although gas carbons or other forms of carbon black may also be used. Other rubber compounding materials which may be packaged according to this invention, preferably each one in a separate container, although two or more of them may be mixed together in a single container if so desired, include other types of fillers such as clays, calcium, aluminum hydrates, mica, asbestos, cotton linters, cotton flock, blanc fixe, zinc oxide, magnesium carbonate, etc., various sulfurizing materials such as sulfur itself, in the form of finely pulverized crushed sulfur or flowers of sulfur, or corresponding related materials, selenium and tellurium, or various activators such as zinc oxide, litharge, stearic acid, etc., as well as vulcanization accelerators, including Captax (mercaptobenzothiazole) Altax (benzothiazyl disulfide), or Tuads, etc., various anti-oxidants, e. g., phenyl beta naphthylamine, polymerized trimethyl dihydroquinoline, hydroquinone, mono benzo ether, N-paratolyl N'-paratolysulfonyl paraphenylindiamine, etc., pigments such as whiting, titanium dioxide, lithopone, etc., or dyes (if added in powdered form) or other compounding ingredients such as modifying resins which may be in crushed, granulated or other suitable forms.

The thermoplastic or otherwise plastifiable material of which the self-supporting container film is made, is preferably a synthetic copolymer of a polymerizable cyclic compound such as styrene with an aliphatic olefin such as isobutylene. The general method of preparing such copolymers is described in U. S. Patent 2,274,749 and consists in polymerizing the reactants at a temperature below 0° C. in the presence of an active halide polymerization catalyst of the Friedel-Crafts type such as boron fluoride or aluminum chloride, with or without a diluent or refrigerant such as liquid propane, etc., and using various proportions of reactants. However, for the purposes of the present invention this copolymer must be prepared within a restricted range of proportions of reactants and under restricted temperature conditions. The proportion of polymerizable cyclic compounds, e. g. styrene, in the reactant feed should be about 40 to 70%, preferably about 45 to 60% by weight, and the copolymerization should be carried out at a temperature below −50° C., preferably at least as low as −78° C., the temperature obtained by internal refrigeration with solid carbon dioxide, or −103° C. as obtained by internal refrigeration with liquefied ethylene, or at even lower temperatures. Best copolymer properties are obtained by using as catalyst $AlCl_3$ or $BF_3$, etc., which has been pre-dissolved in an inert solvent such as methyl chloride or ethyl chloride.

By thus restricting the proportions of reactants and the copolymerization temperature, high molecular weight copolymers are obtained which have an intrinsic viscosity above 0.5, up to about 3, and preferably in the range of 0.7 to 2.0 or so. These copolymers are thermoplastic solids which have sufficient flexibility and toughness, particularly in the heat-softened condition, to permit ready rolling out into thin sheets or films on suitable equipment such as the conventional calender used in rubber processing.

In preparing a thermoplastic copolymer of the type referred to above, one may use other materials in place of the styrene reactant, e. g., alphamethyl styrene, paramethyl styrene, vinyl naphthalene, dihydronaphthalene, indene, or other polymerizable monoolefinic compounds, preferably hydrocarbons containing a cyclic nucleus, preferably an aromatic nucleus. In place of the isobutylene one may use other isoolefins, e. g., 2-methyl 1-butene, or lower olefins, e. g. propylene, and if desired one may also make tripolymers by adding to the mixture of styrene and isobutylene or equivalent materials, a small amount of a diolefin, e. g. 5 to 20% of butadiene or 0.5 to 3% of a more effective diolefin such as isoprene.

The copolymerization is effected by mixing the two reactants, with or without a solvent, if necessary, such as ethylene, propane, butane, methyl chloride, refined naphtha, etc., and then after cooling the reactants to the desired low temperature, adding an active halide catalyst such as boron fluoride, or activated boron fluoride catalyst (.1% ether added), aluminum chloride, titanium tetrachloride, aluminum alkoxide-aluminum chloride complex ($AlCl_3.Al(OC_2H_5)_3$) and the like. If desired, such catalyst may be dissolved in a solvent such as carbon disulfide, a low molecular weight sulfur-free saturated hydrocarbon, a lower alkyl halide, e. g., methyl chloride or ethyl chloride or a mixture of methyl chloride with butane, at or below the boiling point of the catalyst solvent, and then the catalyst solution cooled down, filtered and added to the reaction mixture. Other catalysts may be used such as $AlBr_3$, $TiCl_4$, or various mixed catalysts or catalyst complexes as are known for such purposes. Volatile solvents or diluents, e. g., propane, ethane, ethylene, methyl chloride, carbon dioxide (liquid or solid), etc., may also serve as internal or external refrigerants to carry off the liberated heat of polymerization. After completion of the copolymerization, residual catalyst is killed with alcohol, for example, isopropyl, and excess catalyst removed by washing the product with water and preferably also with dilute aqueous caustic soda. The resulting solid copolymer may range from a relatively stiff plastic mass to a hard tough thermoplastic solid, depending upon the temperature of copolymerization, the yield of polymer obtained upon the active feed, the type and concentration of catalyst, the proportion of cyclic reactant in the feed, and the temperature at which the physical texture is observed.

The proportions in which the reactants, e. g., styrene and isobutylene, have actually combined during copolymerization may be determined by interpolation of a carbon-hydrogen analysis between the limits, for instance:

|  | Carbon | Hydrogen |
|---|---|---|
|  | Percent | Percent |
| Pure styrene | 92.3 | 7.7 |
| Pure isobutylene | 85.7 | 14.3 |

For preparing self-supporting films of a styrene-isobutylene copolymer for use as a container or wrapper according to this invention, the copolymer having a suitably high intrinsic viscosity as mentioned above, should be heated well above the softening point, for instance, to a temperature of about 100–180° C., preferably in a kneader type mixer followed by a hot mill to bring the entire mass to a uniform temperature and plasticity and then it may be sheeted out into a thin film by processing on a rubber calender. For instance, if a three roll calender is used, the center roll may be heated to about 220° F., the top roll maintained at about 250–300° F. and the bottom roll at about 80° F. The film may be stripped from the middle roll and allowed to cool on the bottom roll, then subsequently rolled automatically on a mandrel, or directly out into sheets of the desired size and rolled, folded or otherwise formed into containers of the desired size and shape.

In preparing such a styrene-isobutylene copolymer or other equivalent film, one may add small amounts of other materials to the plastic mass before sheeting it out into thin film form, as for instance small amounts of soluble coloring agent such as blue, red, yellow, green or other colored dyes, preferably of the oil-soluble types, or various colored pigments, or light-absorbing substances such as quinine, esculin, etc. to protect any of the contents of the container from the harmful effect of sunlight and ultra violet light, etc. during storage or shipment. Other powdered fillers may be added, or small amounts of plasticizers or calendering aids may be used, such as carbon black, finely ground mica, e. g., a product marketed under the name Mineralite, or zinc stearate, paraffin wax, cetyl acetamide, octadecyl amine, hydrogenated castor oil, modified fatty acid esters such as Acrawax B, or resinous or plastic materials which may be used to slightly modify the physical characteristics of the copolymer film without deleteriously affecting the chemical properties thereof or its compatibility with any solid or liquid base stock with which the container film may later be intended to be compounded. If desired, the film material may have admixed therewith some of the same comminuted solids, e. g., carbon black, etc., as intended to be used as contents in the container, as such procedure facilitates and accelerates the subsequent compounding into a homogeneous composition.

Examples of plastic or rubbery materials which may be compounded in varying proportions with the plastifiable container film material, for instance in proportions of 1 to 5% or more, include high molecular weight polybutene (preferably having a Staudinger molecular weight of 30,000 or more), high molecular weight polymethyl pentadiene, e. g. 30,000 or more molecular weight, solid polyethylene of high molecular weight, and natural or synthetic rubber or cyclized or other derivatives thereof, etc.

Instead of a styrene-isobutylene copolymer, or a tripolymer as just described, one may also use other types of thermoplastic materials such as polyethylene, polyvinyl chlorides, polyvinyl butyrals, polyvinyl acetates, copolymers of diolefines styrene, copolymers of diolefines acrylonitrile, for packaging comminuted solids intended to be compounded subsequently with a liquid or plastic base stock compatible with such thermoplastic materials.

Although it is primarily intended that the plastifiable container material be thermoplastic, it may also be susceptible to plastification or actual solution by mixing with various volatile or non-volatile solvents such as naphthas, ketones, water, esters. It is understood, of course, that in case such a solvent is used both it and the solution of the plastifiable container material must be compatible with the liquid or plastic base stock with which they are subsequently to be compounded. For instance, a container made out of a thin self-supporting film of cellulose acetate may be used for packaging various red, blue, yellow or other colored or white or black pigments or fine flake aluminum dust, etc., for use in compounding with a cellulose acetate lacquer. For instance, water-soluble dyes may be packaged in polyvinyl alcohol film containers. When a vat dyeing procedure is to be carried out the package of water-soluble dye may be thrown into the vat and will subsequently dissolve; the container being water-soluble and present in insignificant concentration will not deleteriously affect the final dyed product. For instance, in paper dyeing, a package of dye comprising a packaging material which is water-soluble, (e. g. polyvinyl alcohol), may be thrown directly into the paper beater.

The plastic or liquid base stock with which the package comprising the container and its contents, are to be compounded, is preferably a conventional unvulcanized rubber batch, as the invention has been found particularly applicable as a means of adding fine dusty carbon black to the rubber batch with a minimum of dust nuisance. However, the effects may also be applied to other plastic solid base stocks such as phenol formaldehyde resins, polyvinyl chlorides, urea formaldehydes, melamine resins, or other resins which are compounded with fillers. One liquid base stock to which the invention may be applied has been suggested above, namely, a cellulose acetate lacquer base stock, but others may be used such as rubber cements, synthetic rubber cements, phenol resin base stocks, vinyl resin base stocks, etc.

Although it has previously been emphasized that one of the chief advantages of the invention is the elimination of dust nuisance in the rubber compounding operation, it should also be noted that an additional great advantage is that the invention provides a simple and efficient method of adding the carbon black or other comminuted solids in desired controlled amounts, by merely having the carbon black or other solids put up in packages of fixed predetermined net weight or volume, preferably in units of various size such as large, medium and small. For instance, carbon black may be packaged in large bags holding 50 lbs. or so, or medium size bags holding 10 or 20 lbs. and small bags holding 5 lbs. or even 1 lb. or less, so that if it is desired to compound 35 lbs. of carbon black in a batch containing 100 lbs. of rubber stock, one could simply throw into the batch of rubber as it is being banburied, 3 bags holding 10 lbs. each of carbon black and one bag of 5 lbs., or 7 bags holding 5 lbs. each.

In preparing a container or wrapper from the styrene-isobutylene thermoplastic copolymer or other suitable material, the latter is preferably sheeted into thin self-supporting film ranging from about .001 to .05 inch thick depending primarily upon the size of the container intended to be made, or the weight of the comminuted solid to be packaged. The preferred thickness range is about .002 to .02 inch. Films having a thickness in the upper range of those suggested, e. g., from about .005 to .05 inch have sufficient strength as to not require any outside paper, corrugated paper, cloth, wood, plywood, cardboard, metal, non-compatible plastic or other type of non-plastifiable cover or container, whereas when films are made having a thickness of from .005 down to .001 or thinner, they are best suited either for packaging only small amounts of comminuted solids, such as preferably not more than 1 lb. or even smaller amounts such as a few ounces of materials such as ultra accelerators or antioxidants, etc. which are only used in small proportions in rubber compounding, or else such thin films may be used in preparing a container which will be shipped or handled within some outer container intended to give mechanical support and protection against breaking or tearing.

The thermoplastic or other plastifiable container may be made in various shapes such as bags, tubes, boxes or other regular or irregularly shaped packages. If desired, the container need not be preformed before packaging the powdered material, but the invention may be carried out by placing a desired amount of comminuted solids on a large sheet of the self-supporting thermoplastic film, and then the sides and/or corners of the latter may be folded up or gathered up around the solids in any suitable and convenient manner in order to retain the solids within the wrapper. If desired, the package may be closed by heat sealing, to make an absolutely dust-tight and gas-proof package, or, especially as may be preferred in the case of containers in the shape of a bag, the top edge of the bag may merely be gathered or crumpled together and twisted while in a heat softened condition or may be tied shut, preferably by use of a thin filament or cord made up of strands of the same type of substance from which the container film itself is made, for instance filaments of a styrene-isobutylene copolymer which may very easily be made by extrusion.

It is thus apparent that some of the advantages accruing from the use of the present invention include, (1) improvement in general working conditions in rubber factories and other places where the invention can be applied, because it results in a cleaner atmosphere; (2) reduction in wear on the equipment, because of dust elimination; (3) reduction in amount of air conditioning required, such as filters, fans, etc.; (4) reduction in amount of weighing required; (5) speed up of production schedules; and (6) the possibility of making attractive and convenient packages for handling dusty and other fine material.

Figure 2:
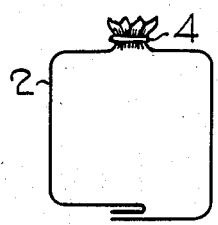
Figure 3:
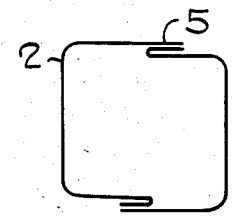
Figure 4:
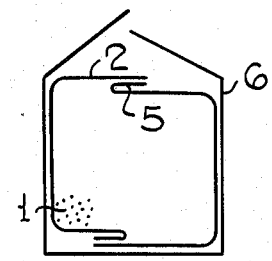
Figure 5:
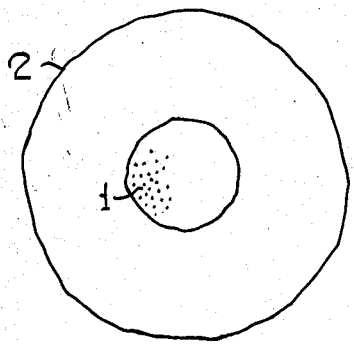
Figure 6:
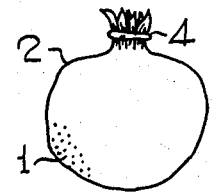
Figure 7:
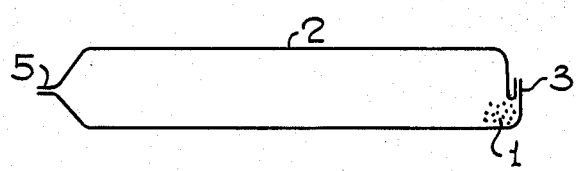
Figure 8:

In the accompanying drawing, Fig. 1 shows a vertical section of an open bag made of thermoplastic substance and filled with comminuted solids. Fig. 2 shows a side elevation of a similar bag closed by gathering the open end of the bag tightly and then tying it shut with a cord made of similar thermoplastic substance. Fig. 3 shows a side elevation of a bag similar to those in Figs. 1 and 2 but closed by folding over and heat-sealing or solvent-sealing the top. Fig. 4 shows a vertical section of a bag similar to that shown in Fig. 3 but placed inside an outer container for mechanical protection during handling and shipping. Fig. 5 shows a prospective view of a flat circular sheet of thermoplastic substance having on it a pile of comminuted solids intended to be packaged therein. Fig. 6 shows a vertical section of the package resulting from gathering up the outer edges of the thermoplastic sheet shown in Fig. 5 and tying them at the top. Fig. 7 shows a vertical longitudinal section of a thermoplastic container in the shape of a cylindrical tube; fabricated preferably by extrusion or by extrusion and blowing or by folding and sealing a flat sheet formed by extrusion, calendering or casting, filled with comminuted solids and having the end closed by crimping together and heat-sealing. Fig. 8 shows a cross section of the cylindrical tube shown in Fig. 7. In all of the figures like reference numerals refer to like parts.

In Fig. 1, showing a vertical section of an open bag filled with comminuted solids, these solids represented by the reference numeral 1, may be any dry finely divided solid such as carbon black or other suitable filler or pigment. The bag 2 is made of a thermoplastic or otherwise plastifiable substance, such as a styrene-isobutylene copolymer of the type described above. The bag 2 is shown as having its bottom edge 3 folded over and heat-sealed in order to make a dust-tight bottom closure. The open top of the bag 2 in Fig. 1 may be closed in any suitable manner, for instance as shown in Fig. 2 by gathering, crumpling and tying the top edge of the bag with a cord or tie string 4 preferably made of the same type of thermoplastic substance of which the bag 2 is made. Fig. 3 shows an alternative method of closing the top of the bag 2 by folding and heat-sealing it as shown by reference numeral 5.

Fig. 4 shows a vertical section of a bag 2 made of thermoplastic substance as in Figs. 1, 2 and 3, then filled with comminuted solid 1 and closed by heat-seal 5, and then placed within an outer container 6 which may conveniently be a conventional corrugated paper or cardboard box, the top of which is shown open in Fig. 4. When the finely divided solids are ready to be used, it is merely necessary to open the outer box 6 and either lift out or dump out the inner package and if its contents are rubber compounding ingredients, toss it onto the rubber mill for mixing into a batch of rubber being masticated.

Fig. 5 shows a conical shaped pile of comminuted solids such as carbon black on a flat circular sheet 2 of thermoplastic substance such as a styrene-isobutylene copolymer, to be used as a wrapper for packaging the finely divided solids by merely gathering up the outer edges of the circular sheet 2 and crumpling them together as shown in Fig. 6, tying the top of the resultant bag with a suitable cord 4. This entire bag may then be tossed directly into a batch of rubber being banburied.

It is apparent that any accurate or controlled weight of carbon black or other comminuted solids may be either weighed onto flat sheets as shown in Fig. 5 and gathered into a bag and tied as shown in Fig. 6, or else weighed directly into a preformed bag as shown in Fig. 1 and tied as in Fig. 2 or heat-sealed as in Fig. 3; and then the resulting bag in either case, is tossed into a batch of rubber in the banbury. Several advantages are thus obtained, (1) dust elimination in the rubber factory, and (2) a substantial saving in time by eliminating the weighing operation in the rubber factory per se, because the packaging of the carbon black or any other compounding ingredients such as the zinc oxide, sulfur, accelerators, etc., may all be done outside of the rubber factory itself or in a room set aside for this purpose. In fact, the packaging of these finely divided solids in controlled amounts by weight or volume in bags or other suitable containers made of thermoplastic material such as a styrene-isobutylene copolymer should preferably be done at the place where the finely divided solids are manufactured or at least where they are pulverized.

Fig. 7 shows a vertical longitudinal section of a cylindrical container 2 made of suitable thermoplastic or otherwise plastifiable material which may have been produced in cylindrical form, either by extrusion into a seamless tube, extrusion and blowing, or by rolling a flat strip into cylindrical form and then heat-sealing a slightly overlapped edge. In the use of such a container it is preferable to fold over and heat-seal or solvent seal one end which may be considered the bottom end as indicated by the reference numeral 3, then fill the hollow tube with comminuted solids 1 from the top and finally fold the top edges together and heat-seal or solvent seal them as indicated at 5. In Fig. 8 the tube described in Fig. 7 is shown as having a circular cross section, but it should be understood that the cross section is not limited to circular but may be square, rectangular, elliptical, triangular or any other shape which most expeditiously solves the packaging problem for any particular comminuted solids.

The invention will be better understood from a consideration of the following examples:

A styrene-isobutylene copolymer containing about 50% by weight of combined styrene, and having an intrinsic viscosity of about 0.75, due to its manufacture at a copolymerization temperature of —103° C., and containing 2% by weight of zinc stearate, added for the double purpose of facilitating removal of the copolymer from the copolymerization reaction mass as well as to serve as a processing aid preventing the copolymer from adhering to the rolls when sheeted out into a thin film, was compounded in 90% concentration with 5% by weight of finely ground mica and 5% by weight of a modified fatty acid ester plasticizer sold under the trade name Acrawax B, this compounding being done at about 225° F. on a hot mill consisting of a pair of heated steel rolls as used for masticating rubber, and then was sheeted out into a thin film of about 0.003 inch gauge on a rubber calender. This film was then formed into a bag-shaped container by folding and solvent-sealing the laps. The volume of the bag formed was about 300 cubic inches. This container was then filled with carbon black of channel black type (net weight about 4 lbs.), and was then solvent-sealed and placed inside a paper bag. Impact resistance tests on this bag container revealed that outside paper covers had less rupture strength than the styrene-isobutylene copolymer inner bag.

The same type of styrene-isobutylene copolymer blend was sheeted to a thickness of .010 inch and was formed into containers of same size and shape as in preceding illustration, and these thicker ones were found to have sufficient strength as to not require an outside paper or cardboard cover.

Styrene-isobutylene bags of both thicknesses just described, and filled with about 2 lbs. of carbon black, were mixed into about 3 lbs. of rubber batch being masticated in a Banbury mixer, and they were found to blend very quickly and in a substantially dust-free manner, with the several different types of rubber and synthetic rubber tested, namely natural rubber, synthetic GR-S rubber (made from 75% butadiene and 25% styrene by emulsion polymerization), and synthetic GR-I rubber (made at low temperature, e. g. −103° C. from 97-99% isobutylene and 1-3% isoprene by use of a dissolved Friedel-Crafts catalyst).

The invention is especially useful when compounding plastic materials such as rubber with finely divided solids such as carbon black, in a Banbury type mixer, preferably equipped with a lid which can be closed in order to prevent escape of powdered materials from the mixing batch. Such mixers in commercial use, generally have a capacity ranging from 50 lbs. to 400 lbs. For instance, a 250 lb. batch of compounded rubber is frequently mixed in one batch. Although the proportion of carbon black in the rubber batch may vary over wide ranges, a commonly used formula calls for about 50 lbs. of carbon black for each 100 lbs. of rubber.

In the operation of the Banbury mixer, common practice includes mixing the carbon black and rubber, together with any other compounding ingredients except the accelerators, at a fairly elevated temperature such as 250 to 350° F., until the batch is thoroughly homogeneous and of proper plasticity, and then the batch is cooled or permitted to cool to a medium temperature such as 150 to 200° F., or even as low as room temperature, and then the vulcanization accelerator is added and mixed quickly until homogeneous, after which the batch is promptly formed into the desired shape such as tires for automobiles, airplanes, etc., and then cured.

When using for the carbon black bags, a film of styrene-isobutylene copolymer having the preferred characteristics indicated hereinabove, the actual weight of such copolymer present in the finished compounded rubber batch is relatively small, as previously described, but nevertheless contributes a slight, but substantial, plasticizing effect on the rubber batch, and therefore, if desired, the use of other plasticizers such as mineral oils, waxes, etc., as used heretofore in the art, may be substantially reduced, or completely eliminated.

When applying the invention to the mixing of rubber batches in a Banbury mixer, the invention has special advantages of cleanliness, convenience, less manual operation (more automatic) and less errors due to miscalculating or misweighing.

If the application is applied to the compounding of rubber on open roll mills, the chief advantages are the saving in time due to not having to weigh the added powdered ingredients, but merely throwing onto the rubber mill the desired number of bags, for instance of carbon black, having the proper combination of weights to give the desired total, and also the advantage of not letting any paper from the conventionally used paper bags get into the mixing rubber batch.

If desired, before tossing the plastic bag of carbon black either onto the open rubber mill or into a Banbury mixer, a hole or slit may be jabbed into part of the bag to release air pressure when the bag is squeezed in the roll or mixer.

The invention has a special advantage for packaging and compounding dry, powdered hygroscopic materials into rubber or other plastic batches, because a thin flexible self-sustaining film of styrene-isobutylene copolymer, for instance, has very low moisture-vapor permeability and is excellent for packaging dry powdered materials which normally tend to absorb moisture from the air during storage.

In the appended claims the expression "intrinsic viscosity" is intended to mean as determined in toluene as solvent.

This application is a continuation-in-part of application Ser. No. 638,427 filed December 29, 1945.

It is not intended that this invention be limited to the specific modification of materials which have been mentioned merely for the sake of illustration but only by the appended claims in which it is intended to claim all novelty inherent in the invention as well as all modifications coming within the scope and spirit of the invention.

We claim:

1. The method of manufacturing compounded rubber materials comprising a major proportion of a plastic rubbery base stock and a minor proportion of carbon black, which comprises packaging said carbon black, at a location removed and separated from the rubber compounding zone, in closed containers made of a thin self-supporting thermoplastic film consisting essentially of a copolymer of about 40 to 70% by weight of a polymerizable monoolefinic compound containing a cyclic nucleus, and about 60 to 30% by weight of an alkene of 3 to 5 carbon atoms, said copolymer having an intrinsic viscosity of about 0.6 to 3.0 and being compatible with the rubbery base stock with which the carbon black contained therein is to be compounded, delivering the closed packages of carbon black into the rubber-compounding factory, and feeding said closed carbon black packages without opening them, directly into the mixing equipment for compounding in desired proportions with the plastic rubber base stock, and compounding said container and carbon black into said rubbery base stock until the composition is homogeneous.

2. Process according to claim 1 in which the rubber base stock comprises at least 60% of hydrocarbon rubber.

3. Method according to claim 1 in which the rubber base stock is natural rubber.

4. Method according to claim 1 in which the rubber base stock is a synthetic rubbery polymerization product comprising at least 60% by weight of unsaturated aliphatic hydrocarbon of 3 to 5 carbon atoms.

5. Method according to claim 1 in which the rubber base stock is a synthetic rubbery copolymer of about 95% to 99% by weight of isobutylene and about 1 to 5% of isoprene, having a molecular weight of at least 20,000 and having an iodine number of about 1 to 50.

6. Method according to claim 1 in which at least some dry powdered solids, other than carbon black, used as rubber-compounding ingredients, are added to the rubber mixing batch, said materials being added while packaged in thin film copolymer containers made of the same copolymer as the carbon black containers are made of.

7. Method according to claim 1 in which vulcanizing ingredients are also compounded into the rubber batch, and then the finished compounded batch is shaped and vulcanized.

8. A method of manufacturing rubber which comprises packaging carbon black in controlled amounts in closed bags made of a thin self-supporting thermoplastic film of a styrene-isobutylene copolymer having a combined styrene content of about 40 to 70% by weight and an intrinsic viscosity of about 0.5 to 3.0, said film having a thickness of about .001 to .05 inch, delivering into the rubber factory an assortment of such bags of carbon black having net weights of about 1, 5, 10, 20 and 50 lbs., and then feeding the desired number of said bags of carbon black directly on to a heated rubber mill on which a batch of rubber is being masticated, without opening said bags of carbon black, whereby said carbon black and said copolymer film become homogeneously compounded into said rubber batch.

9. In the mixing of rubber, the steps of adding to a rubber compound mix in a closed mixer finely divided powdered ingredients enclosed in a bag of water-insoluble thermoplastic material miscible with rubber compounds at mixing temperatures, said material being thermoplastic at said mixing temperatures and mixing to disrupt and to disperse the powdered ingredients and composition of said bag throughout the mixture.

RAYMOND G. NEWBERG.
FRANCIS P. BALDWIN.

REFERENCES CITED

The following references are of record in the file of this patent:

UNITED STATES PATENTS

| Number | Name | Date |
|---|---|---|
| 216,832 | Collins | June 24, 1879 |

FOREIGN PATENTS

| Number | Country | Date |
|---|---|---|
| 23,554 | Great Britain | of 1896 |